April 17, 1945.  J. O. YORK ET AL  2,374,066
BOMB RACK
Filed Jan. 4, 1941
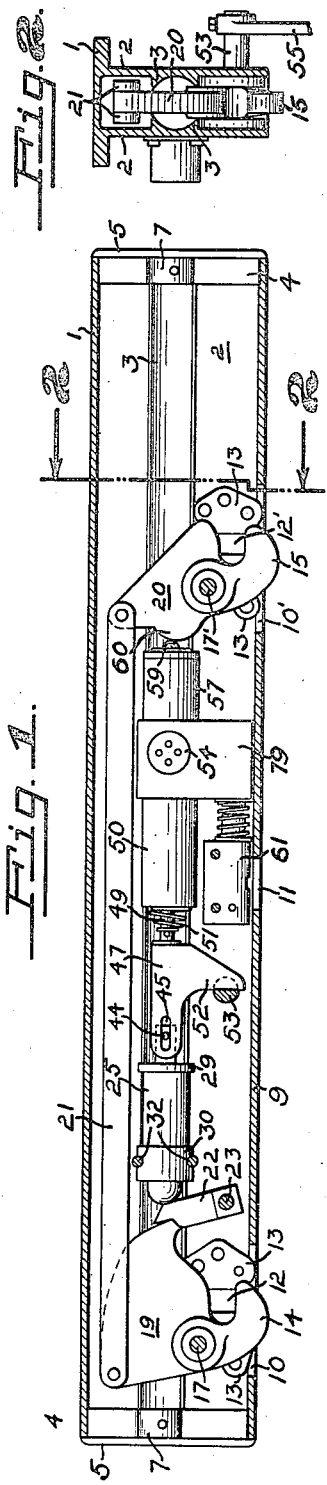
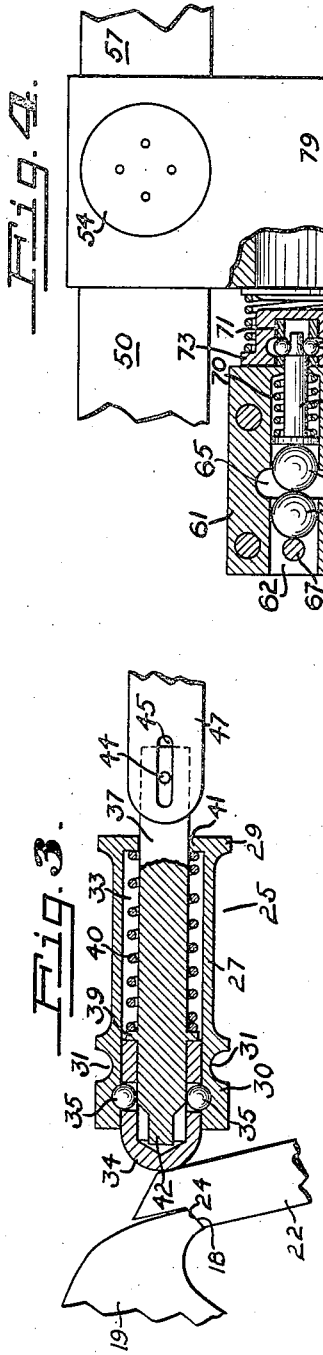
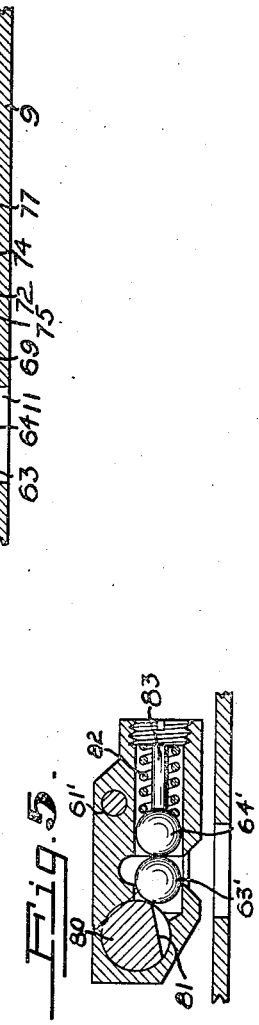
INVENTORS,
JONES O. YORK.
JAMES C. WINSLOW.
BY
*Lippincott & Metcalf*
ATTORNEYS.

Patented Apr. 17, 1945

2,374,066

UNITED STATES PATENT OFFICE 2,374,066

BOMB RACK

Jones O. York and James C. Winslow, Inglewood, Calif., assignors to Northrop Aircraft, Inc., Hawthorne, Calif., a corporation of California Application January 4, 1941, Serial No. 373,068

4 Claims. (Cl. 89—1.5)

This invention relates to racks for carrying aircraft bombs. Among its objects are: To provide a rack of minimum weight and maximum carrying capacity; to provide a rack which will hold a bomb securely until its release is desired, and then will give a positive release; to provide a rack which may be released either mechanically or electrically and wherein a number of racks may be connected together, again either mechanically or electrically, to give simultaneous release or wherein the release may be achieved either individually or separately; to provide a rack wherein the bombs may normally be carried "safe," and which will, if operated under emergency conditions, drop the bombs still in the safe condition, but which is provided with a trip which may be operated either electrically or mechanically and which will, when operated, arm the bombs so that they will detonate on impact or upon the operation of a time fuse; to provide a rack which is adapted for operation with the bomb selector mechanism described in our co-pending application, Serial No. 373,069, filed Jan. 4, 1941, by means of which the racks may be operated and the bombs dropped either simultaneously from all racks or in any desired order from individual racks or groups of racks, and to provide a plunger latch mechanism of simple construction and positive action whereby the arming and releasing operations can be accomplished with small application of energy even where the load carried by the rack is very large.

Other objects of this invention will be apparent or will be specifically pointed out in the description forming a part of this specification, but we do not limit ourselves to the embodiment of the invention herein described, as various forms may be adopted within the scope of the claims.

The invention may best be understood by reference to the accompanying drawing wherein:

Fig. 1 is a longitudinal sectional view of a rack embodying our invention, the plane of section being vertical.

Fig. 2 is a transverse sectional view through the rack, the plane of section being indicated by the line 2—2 of Fig. 1.

Fig. 3 is a fragmentary view, partly in section, showing the mechanism of the release plunger.

Fig. 4 is a similar view showing one form of arming mechanism, adapted for electrical operation.

Fig. 5 is a fragmentary sectional view of alternative form of arming mechanism adapted for manual control.

In its preferred form the rack comprises a frame formed as an extruded section of light, high tensile strength alloy, such as "dural" or the newer magnesium alloys. The shape of this section is best shown in Fig. 2. In form it is a deep, narrow channel, comprising a top flange 1, from which depend side plates 2. The top flange is preferably provided with extensions on either side of the two dependent side plates, to provide means whereby the rack may be bolted or clamped to any desired form of supporting structure. The side plates 2 are each provided with an internally projecting concave rib 3, which ribs are opposed to form between the two side plates an interrupted cylindrical opening, between which certain cylindrical elements of the mechanism may be clamped and firmly held in place as will later be described.

Pinned or otherwise secured to the extruded frame are two end plates 4, each comprising a cover plate 5 whose edges conform to the outer outline of the section, from which a flange 7 projects conforming to the inner channel and positively positioning the plates. There is also provided a lower cover plate 9 for housing the rack mechanism completely, except for the necessary gaps 10, 10', and 11 to which the necessary connections are made between the bomb and the operating mechanism of the rack.

Each of the side plates 2 is provided with a pair of rectangular notches 12, 12' which are spaced to receive the standard carrying lugs of a bomb, these lugs being equally spaced irrespective of the size of the bomb to be carried, and there are preferably provided striker plates 13 of hardened steel which are riveted or otherwise secured to the side plates 2 on either side of the notches to protect the sides of the same from battering by the bomb lugs.

The actual support of the bomb is by a pair of hardened steel hooks 14 and 15, which are journaled on shafts 17 and 17', mounted between the side plates. These shafts are both adjacent to their respective notches 12, 12', but displaced to one side thereof, so that the weight of the bomb tends to rotate the hooks 14 and 15, permitting the bomb to drop. The hooks respectively carry extensions 19, 20, projecting above their pivotal mountings and acting as lever arms to which links 21 are pivoted, the links 21 connecting the two hooks so that their movement is in unison and both of the bomb lugs, when released, will be released simultaneously.

Extension or lever arm 19 of the hook 14 (which may be termed the master hook) is formed as a sector or plate extending forward, over the notch, so as to form a striker plate which contacts the bomb lug upon loading a bomb and automatically latches the bomb rack. The extreme tip of the forward extension has an approximately vertical or slightly backwardly sloping surface (as considered with the hook in the loaded position) beneath which is a face 18 which slopes back toward the pivotal mounting of the hook, at an oblique angle. A hardened steel sear 22, pivotally supported between the side plates on a shaft 23, is provided with a face 24 which is conjugate to and engages the face 18 of the sector 19, plus an extension which engages the tip of the sector and prevents the sear from falling toward the notch. The shaft 23 is located near the lower edges of the side plates and beyond the greatest dimension of the sector 19, so that when the hook 14 is in the loaded position the sear slopes toward the sector with the face 24 engaged with the sector. This disposition of the parts results in the maximum stress imposed upon the sear by the tendency of the hook to rotate under the weight of the bomb being longitudinal of the sear. The oblique face 18 of the sector, however, does exert a camming action which tends to rotate the sear on its shaft, but the tangential moment thus imposed is relatively small in comparison to the weight of the bomb, both by reason of the greater lever arm of the sear than that of the bomb with respect to the shaft 17 and because of the direction of the line of application of the force against the sear. By a minor alteration of the design, changing the obliquity of the faces 18 and 24, the relative magnitude of the radial (or longitudinal) force on the sear and the tangential force which tends to disengage the sear, may be varied at will.

The sear is held in engagement with the sector 19 by a spring plunger designated by the general reference character 25. The detailed structure of this plunger is shown in Fig. 3. It comprises a hardened steel housing or cylinder 27 which is provided with flanges 29 and 30 of such diameter as to fit the channel formed between the ribs 3. A pair of transverse grooves 31 are formed in the flange 30, for receiving a pair of cross bolts 32 which pass through the frame transversely and clamp the housing 27 in position.

Within the housing is a cylindrical bore 33, within which slides a domed hardened steel cap 34. The dome of the cap merges with a cylindrical sleeve, provided with a number of radial perforations which are of such size as to receive easily an equal number of steel balls 35; these balls being of such size that their radius is nearly equal to the thickness of the wall of the cap.

When the plunger is in the advanced position shown in the drawing, with the cap 34 bearing against the sear 22, the balls 35 seat in a semi-toroidal groove formed within the flange 30 of the housing 27. Movement of the balls 35 within the perforations in the cap 34 and the groove is controlled by an inner plunger 37. This plunger has a flange 39 which is forced against the inner end of the cap 34 by a spring 40 bearing against the end 41 of the housing 27. Beyond the flange and up to a point slightly beyond the centers of the balls 35 the plunger is of such diameter as to slide freely within the cap 34; beyond which point it has a tip 42 of reduced radius connecting with the main body of the plunger by a sloping shoulder. The reduction in radius of the tip is substantially equal to the radius of the balls 35, and it follows that when the plunger 37 is fully advanced within the cap 34 the main diameter of the plunger holds the balls seated within the groove. If, however, the inner plunger be retracted, force from the sear applied against the end of the cap will tend to roll the balls out of the groove and back into the recess formed by the reduced tip 42. When the balls are seated against the groove they are stressed almost purely in shear, and the cap is firmly latched in position, but with the balls forced inward against the tip 42 the cap is free to slide within the housing, permitting the sear to drop back and release the hook 14 and consequently, the hook 15 which is linked thereto.

The end of the plunger 37 extends through the end 41 of the housing and carries a cross pin 44 which slides in a slot 45 in a release link 47. This release link is in the form of a yoke with one arm extending on either side of the plunger 37. The other end of the link is mounted on a rod 49, which may be either integral with or connected to the plunger armature of a solenoid 50. A spring 51 normally urges solenoid and link toward the plunger 37, and against a stop formed by a depending arm 52 which is integral with the link and engages a half round shaft 53 journaled in the side plates 2.

Connection to the solenoid is made through a multiple plug 54. When the circuit to the solenoid is closed, its plunger is attracted, sliding the link 47 backward along the pin 44 until the latter reaches the end of the slot 45, at which time the armature and link have acquired a considerable momentum, striking a hammer blow against the pin and thus retracting the plunger 37, permitting the balls 35 to fall in against the plunger tip 42, and thereby permitting the cap 34 also to retract and release the sear and thus the hooks 14 and 15.

This action is extremely positive. The entire bomb rack, including the parts yet to be described, weighs less than six pounds. It has been tested under loads as high as thirty-five hundred pounds, and has been found to hold such loads safely and to release them positively. The maximum force exerted between the link 47 and the pin 44 to effect such release is less than twenty pounds, and since this force is secured by impact the maximum pull exerted by the solenoid is greatly less than this, i. e., of the order of five pounds.

In case of damage to the electrical system, or if desired for any other reason, hand release may be effected by rotating the shaft 53, which is provided with a hand lever 55 for the purpose; thereby exerting a camming action against the arm 52 of the link and so retracting the plunger 37 as in the case of electrical operation. Bomb racks are customarily mounted side-by-side, and it is therefore possible to extend the shaft 53 through a number of adjacent racks, or to use separate shafts 53 and inter-connect them with flexible couplings, so that all or any desired number of racks may be made to release their loads simultaneously.

In order to supervise the electrical operation of the rack, particularly when operated in connection with the selector system of our copending application above referred to, there is provided a normally open push button switch 57 which is depressed and closed by an arcuate lug 60 on the extension 20 of the hook 15 when the rack is loaded. When the bomb is released the projection and lug move forward allowing the switch to open. In practice it is connected through one of the contacts of the plugs 54 to a pilot light, as shown in the copending application, which is thus extinguished to indicate that its corresponding rack is empty.

Although the primary function of a bomb rack is to carry the bombs and release them at will, there is also the necessity of "arming" the bombs before they are dropped. It is an almost universal practice to carry the bombs in a "safe" condition. Whether they be provided with time or percussion fuses, these fuses are normally held inoperative by a screw on which a small propeller or air screw is mounted. The screw is threaded into either the nose or the tail of the bomb, or, in some instances, both.

The propeller and screw are held from turning by a wire when the bomb is in "safe" condition. If the wire be withdrawn before the bomb is dropped, the propeller will rotate until the screw is withdrawn, after which propeller and screw will drop off and the bomb will continue its flight with the fuse in active condition. If the wire be not withdrawn before the bomb is released the screw cannot turn, and the bomb will therefore not explode upon landing. Means are therefore provided for so holding the arming wire that should it be necessary to relase the bomb before a military objective is reached the wire will pull clear to travel with the bomb upon its flight and the bomb will therefore drop in "safe" condition. When, however, a tactical release of the bombs is desired the arming wire is held tightly when the bomb is dropped and the bomb, in falling, pulls the wire clear so that the bomb falls armed. The mechanism for accomplishing this is shown in detail in Figs. 4 and 5. In the form of the device shown in Fig. 4 the arming is done electrically. The device comprises a block 61, having a longitudinal bore 62 therethrough within which a pair of balls 63 and 64 fit freely. A transverse slot 65 extends through the block 61, intersecting the bore, and a pin 67 holds the ball 63 so that its contact with the ball 64 occurs within the range of this slot. The ball 64 is urged against ball 63 by a plunger 69 urged by a spring 70. A loop of the arming wire may therefore be thrust through the opening 11 in the lower cover plate 9 of the rack and the slot 65, and the ball 64 will snap back readily to permit its passage, and if the bomb be released with the arming mechanism in this condition the loop will pull out just as readily and permit the bomb to drop "safe."

Means are provided, however, for locking the plunger 69 so that it cannot thus yield to permit release of the arming wire. Locking of the plunger is accomplished by the application of the same principles as those used on the bomb release mechanism itself. The plunger 69 has a sloping shoulder and reduced diameter end similar to those of the plunger 37, and the reduced end of the plunger extends into a sleeve 71, integral with the block 61. Balls 72 are carried in perforations in this sleeve, and rest against the sloping shoulder, and are held in place by a ferro-magnetic cap 73 which fits over the sleeve and rests against the block 61, urged into that position by a spring 74. When the cap 73 is in this position the balls are forced outwardly into the semi-toroidal groove 75 within the cap when the arming wire is slipped between the balls 63 and 64. The cap 73 forms the armature of electromagnet 77, carried by a mounting block 79 to which the plug 54, solenoid 59, and switch 57 are also secured. Circuit to the electromagnet 77 is completed through another of the contacts of the plug 54 and when the circuit to the electromagnet is closed the armature is attracted, which forces the balls 72 out of the groove 75 and tightly against the shoulder of the plunger 69, so that it cannot move to release the arming wire. Accordingly, when the magnet 77 is excited prior to or simultaneously with the actuation of the release, the arming wire will be retained and the bomb dropped armed.

Where electrical equipment is not available, and it is desired to use a mechanically operated armed-and-safe mechanism, the device of Fig. 4 may be modified as shown in Fig. 5. The balls 63' and 64' are carried in a bore in a block 61', similarly to the balls 63 and 64 of Fig. 4. A shaft 80 having a flattened surface 81 extends through the block. When this shaft is so rotated that the flat surface is presented to the ball 63', the ball 64' is held in contact with ball 63' by a spring 82, and the loop of the arming wire can be slipped in and out in the same manner as in the previously described device. When the shaft 80 is turned to the position shown, however, the ball 63' is forced against ball 64', compressing the spring 82 until the ball 64' hits a stop 83, and when this condition obtains the arming wire is tightly locked in place and will accordingly pull out of the bomb and arm the latter when it is released.

It will be obvious from the foregoing description that in the case of electrical operation the circuits involved are each of the simple series variety. A common exciting battery may, of course, be used, but from this battery the circuits may simply include a switch and the respective magnets or pilot lights, and it is therefore believed unnecessary to show a wiring diagram here, particularly as the more complicated selector circuits are shown in detail in our above mentioned copending application.

We claim:

1. A bomb rack comprising an extruded structural section having the form of a channel with a pair of opposed concave ribs on the inner surfaces of the flanges thereof, said flanges having notches in the edges thereof adapted to receive the carrying lugs of a bomb, a pair of bomb supporting hooks pivotally mounted between said flanges beside said notches and movable to close said notches, a link connecting said hooks to compel movement thereof in unison, a lever arm on one of said hooks, a sear engaging said lever arm, and retaining and releasing means for said sear clamped between the concave faces of said ribs.

2. A bomb rack comprising an extruded structural section having the form of a channel with a pair of opposed concave ribs on the inner surfaces of the flanges thereof, said flanges having notches in the edges thereof adapted to receive the carrying lugs of a bomb, a pair of bomb supporting hooks pivotally mounted between said flanges beside said notches and movable to close said notches, a link connecting said hooks to compel movement thereof in unison, a lever arm on one of said hooks, a sear engaging said lever arm, and a plunger latch including a housing cylinder, bearing against said sear, the cylinder of said latch being clamped between the concave faces of said ribs.

3. In a bomb release mechanism having a bomb carrying hook held in position against the weight of a bomb by a self-releasing sear and a sear control assembly, said sear control assembly comprising a stop for engagement with said sear to hold the same against release, a plunger holding said stop in engagement with said sear, and means for withdrawing said plunger from its stop holding position, said means including a pin and slot connection to said plunger with said pin normally in spaced relationship to the engageable end of said slot, to effect a sudden withdrawal of said plunger in response to operation of said plunger withdrawal means.

4. A bomb rack for handling bombs equipped with removable arming devices, said bomb rack comprising a frame including a pair of side plates each provided with a pair of notches adapted to receive the carrying lugs of the bomb, a pair of hooks pivotally mounted between said side plates adjacent to said notches, a link connecting said hooks to compel their movement in unison, said hooks being movable to close said notches to retain said lugs, a self-releasing sear pivoted between said side plates and adapted when held against one of said hooks to prevent motion thereof under the weight of said bomb, a retractable stop holding said sear against removal from its holding position, means for releasing said stop to release said sear and to free said hooks, a holding means mounted on said frame for engaging the aforesaid arming devices of the bombs, and means mounted on said frame to selectively control said holding means simultaneously with said releasing means to release said bombs with or without said arming devices.

JONES O. YORK.
JAMES C. WINSLOW.